United States Patent
He et al.

(10) Patent No.: US 11,520,676 B2
(45) Date of Patent: Dec. 6, 2022

(54) METHOD AND SYSTEM FOR POWER EQUIPMENT DIAGNOSIS BASED ON WINDOWED FEATURE AND HILBERT VISUALIZATION

(71) Applicant: WUHAN UNIVERSITY, Hubei (CN)

(72) Inventors: Yigang He, Hubei (CN); Xiaoxin Wu, Hubei (CN); Jiajun Duan, Hubei (CN); Xiaoyan Liu, Hubei (CN); Lie Li, Hubei (CN); Zhaorong Zeng, Hubei (CN)

(73) Assignee: WUHAN UNIVERSITY, Hubei (CN)

( * ) Notice: Subject to any disclaimer, the term of this patent is extended or adjusted under 35 U.S.C. 154(b) by 16 days.

(21) Appl. No.: 17/161,680

(22) Filed: Jan. 29, 2021

(65) Prior Publication Data
US 2021/0365342 A1 Nov. 25, 2021

(30) Foreign Application Priority Data
May 25, 2020 (CN) .......................... 202010449882.5

(51) Int. Cl.
*G06F 11/00* (2006.01)
*G06F 11/30* (2006.01)
(Continued)

(52) U.S. Cl.
CPC ...... *G06F 11/3058* (2013.01); *G06F 11/0706* (2013.01); *G06F 11/321* (2013.01);
(Continued)

(58) Field of Classification Search
CPC ............ G06F 11/3058; G06F 11/0706; G06F 11/321; G06F 11/0709; G06K 9/6256;
(Continued)

(56) References Cited

U.S. PATENT DOCUMENTS

| | | | | |
|---|---|---|---|---|
| 2012/0123708 A1* | 5/2012 | Dong | ..................... | H02H 3/042 702/58 |
| 2016/0011268 A1* | 1/2016 | Tsai | ..................... | G01R 31/343 702/58 |

(Continued)

*Primary Examiner* — Sarai E Butler
(74) *Attorney, Agent, or Firm* — JCIPRNET (57) ABSTRACT

A method and a system for power equipment diagnosis based on windowed feature and Hilbert visualization are provided, which belong to the field of power equipment fault diagnosis. The method includes: obtaining an original data set of monitoring data containing power equipment fault features; introducing windowed feature calculation considering logarithmic constraints to process data to obtain a feature sequence; using Hilbert visualization method for further processing to obtain a Hilbert image data set used to train and verify a convolutional neural network; and finally directly inputting newly obtained test sample data after windowed feature calculation and Hilbert visualization processing into the trained network for fault diagnosis and location. The disclosure uses windowed feature calculation and Hilbert visualization to process the monitoring data of a power equipment to fully extract fault features and effectively improve diagnostic accuracy, and uses the convolutional neural network for diagnosis to improve the intelligence of diagnosis.

13 Claims, 4 Drawing Sheets

(51) Int. Cl.
  *G06F 11/07*   (2006.01)
  *G06F 11/32*   (2006.01)
  *G06K 9/62*    (2022.01)
  *G06N 3/08*    (2006.01)

(52) U.S. Cl.
  CPC ......... *G06K 9/6256* (2013.01); *G06K 9/6262* (2013.01); *G06N 3/08* (2013.01)

(58) Field of Classification Search
  CPC ...... G06K 9/6262; G06N 3/08; G06N 3/0445; G06N 3/0454; G06V 10/82; G01R 31/00
  USPC ....................................................... 714/1–57
  See application file for complete search history.

(56) References Cited

U.S. PATENT DOCUMENTS

| | | | |
|---|---|---|---|
| 2016/0146865 A1* | 5/2016 | Morgan ................ | H02J 3/0012 |
| | | | 324/764.01 |
| 2016/0274167 A1* | 9/2016 | Chen .................... | H02P 29/024 |
| 2016/0274169 A1* | 9/2016 | Cui ......................... | H02H 7/28 |
| 2020/0256911 A1* | 8/2020 | Lang ..................... | G01R 27/28 |

* cited by examiner

METHOD AND SYSTEM FOR POWER EQUIPMENT DIAGNOSIS BASED ON WINDOWED FEATURE AND HILBERT VISUALIZATION

CROSS-REFERENCE TO RELATED APPLICATION

This application claims the priority benefit of China application serial no. 202010449882.5, filed on May 25, 2020. The entirety of the above-mentioned patent application is hereby incorporated by reference herein and made a part of this specification.

BACKGROUND

Technical Field

The disclosure relates to the field of power equipment fault diagnosis, and more specifically relates to a method and a system for power equipment diagnosis based on windowed feature and Hilbert visualization.

Description of Related Art

The fault diagnosis of power transmission and transformation equipment is an important guarantee for the safe and economical operation of the power system. With the gradual advancement of smart grid construction, the power equipment will continue to develop toward the direction of intelligence and high integration. However, the current methods for power equipment fault diagnosis are weak in extracting power equipment fault features, so the diagnosis effect is less ideal and cannot satisfy the requirements of smart grid construction. Also, most studies only consider power equipment fault type diagnosis, and the fault location method is seldom considered. At present, in actual power equipment diagnosis, the experience of experts is still very critical, which means that the experts need to have strong prior knowledge of the influence of each parameter on the monitoring curve. Therefore, power equipment fault diagnosis often needs to be implemented by technical personnel with relatively strong professional quality, which is not in line with the developmental trend of smart grid. In order to overcome such limitation, many statistical indicators, such as the correlation coefficient and the root mean square error, have been introduced into equipment diagnosis. However, most statistical indicator calculation methods still have low diagnostic accuracy and insufficient location capability. In order to further extract the features of the equipment when faulty and improve diagnostic accuracy, some machine learning has also been introduced into power equipment fault diagnosis. For example, the introduction of the support vector machine into power equipment fault diagnosis has obtained good results. However, the essence of the support vector machine is a two-classifier, which faces greater challenges as the types of diagnosis increase. Some data visualization methods have also been introduced into power equipment fault diagnosis. However, the diagnosis of visualization methods is limited to visual comparison without any attempt to further improve the intelligence of diagnosis.

Deep learning can implement the automatic screening and fast processing of an abnormal state, and is an important artificial intelligence method. Convolutional neural network (CNN) shows great advantages in the field of image processing, and can extract deep-level features of an image. Deep learning methods with more parameters, such as CNN, need a lot of training data. As a type of machine learning, transfer learning may transfer the knowledge learned in a B field to an A field, thereby effectively reducing the data set required for training and improving the accuracy. Deep transfer learning (DTL) may be obtained by combining transfer learning with CNN, which can effectively extract complex data features when the amount of data is not large enough and achieve good results. Using monitoring data of the power equipment to train a deep network may improve the final diagnosis efficiency and intelligence level.

The data visualization method intuitively condenses a large amount of data onto a two-dimensional image, which effectively saves storage space while highlighting fault features, and is conducive to identification. However, in current research, the purpose of visualizing the monitoring curve is to intuitively observe the changes in values of the curve, rather than as an input to an intelligent diagnosis network. Therefore, it is common to directly draw the power equipment monitoring curve, but such image often has a large area of white space, so subtle features in the image cannot be well identified when inputting the image into CNN for training. Therefore, it is necessary to consider using a two-dimensional filling curve to obtain an image different from a traditional curve, and using graphical features to present fault features.

Therefore, how to use feature extraction technology and visualization technology to effectively extract fault features contained in the monitoring data of the power equipment, and use powerful feature extraction capability of CNN to improve diagnostic accuracy of the power equipment is a technical issue that needs to be solved urgently.

SUMMARY

The disclosure provides a method and a system for power equipment diagnosis based on windowed feature and Hilbert visualization, which may effectively extract fault features contained in monitoring data of a power equipment using feature extraction technology and visualization technology, and improve diagnostic accuracy of the power equipment using powerful feature extraction capability of convolutional neural network (CNN).

In order to achieve the above objectives, according to an aspect of the disclosure, a method for power equipment diagnosis based on windowed feature and Hilbert visualization is provided, which includes the following steps.

(1) Several sets of monitoring data containing different fault locations, fault types, and severity of a power equipment are obtained. Each set of the monitoring data is analyzed. A corresponding fault status label is obtained. Each set of the monitoring data and the corresponding fault status label are used to constitute a target data set. The fault status label includes the fault type and the fault location.

(2) Windowed feature calculation is performed on the target data set considering logarithmic constraints. Fault features contained therein are extracted. A feature sequence data set is obtained.

(3) Hilbert visualization processing is performed on each set of data in the feature sequence data set. A Hilbert image data set is obtained.

(4) A fault diagnosis and location model is constructed. The Hilbert image data set is divided into a training set and a verification set. The fault diagnosis and location model is trained using the training set. The trained fault diagnosis and location model is verified using the verification set.

(5) After performing the same windowed feature calculation and Hilbert visualization on diagnosis data, a final diagnosis result may be obtained from the trained fault diagnosis and location model.

Preferably, the several sets of the monitoring data of the power equipment are: data$_i$ {$a_{i,1}, a_{i,2}, \ldots, a_{i,j}, \ldots, a_{i,N}, s_i$} i∈[1, K], where K is K sets of the monitoring data of the power equipment, $a_{i,j}$ is the monitoring value corresponding to a j(j∈[1, N])-th point in an i-th set of the monitoring data of the power equipment, $s_i$ is the fault status label (including the fault type and location) of the power equipment corresponding to the i-th set of the monitoring data of the power equipment, and N is the number of monitoring data points.

Preferably, Step (2) includes the following.

A monitoring curve of the power equipment in a normal state is taken as a reference curve. The windowed feature calculation considering the logarithmic constraints based on the reference curve is performed to obtain the feature sequence data set. A feature value is a self-defined evaluation indicator or an evaluation indicator provided by different research work.

The feature value may be the self-defined evaluation indicator, or the evaluation indicator provided by different research work, such as a correlation coefficient (CC), a root mean square error (RMSE), a mean absolute percentage error (MAPE), etc. For example, the calculation formula of MAPE after adding the logarithmic constraints is:

$$MAPE^* = lg \frac{\sum_{k=1}^{n_w} \left| \frac{y_k^o - y_k^m}{y_k^o} \right| \times 100}{n_w},$$

where MAPE* refers to MAPE introduced with the logarithmic constraints, $y_k^o$ is the y-coordinate of a point on an FR fingerprint curve in a k-th window obtained, $y_k^m$ is the x-coordinate of a point on other FR curves, and $n_w$ is the number of points in each window.

Preferably, Step (2) includes the following.

(2.1) A window with a specified length $W_w$ is defined. The window scans a frequency band step by step with a step size s from a starting point $x_0$ of a scanning frequency band range to an end $x_n$. Each time the window moves one step, the feature value is calculated within a frequency region of the length $W_w$ of the window. The finally obtained feature sequence length is $$N' = \text{floor}\left(\frac{(x_n - x_0) - W_w}{s}\right) + 1,$$

where s and $W_w$ are positive integer multiples of the shortest interval between monitoring points. If all monitoring data is to be scanned, thus $W_w \geq 2s$. floor represents a round-down function, and returns to the largest previous integer.

(2.2) An x-coordinate of a symmetry axis of a k(k=1, 2, . . . , N)-th window is determined from $$x_k^c = x_0 + \frac{W_w}{2} + (k-1) \cdot s.$$

An x-coordinate of a left boundary is determined from $$x_k^{left} = x_k^c - \frac{W_w}{2}.$$

An x-coordinate of a right boundary is determined from $$x_k^{right} = x_k^c + \frac{W_w}{2}.$$

A number of points contained in each window is determined from $$n_w = \frac{W_w}{\Delta f} + 1,$$

where $\Delta f$ is the interval between two monitoring points.

(2.3) Based on the selected feature value evaluation indicator, a windowed feature value considering the logarithmic constraints is obtained from the x-coordinate of the symmetry axis, the x-coordinate of the left boundary, the x-coordinate of the right boundary, and the number of points contained in each window, so as to obtain the feature sequence data set.

Preferably, the feature sequence data obtained after the windowed feature calculation is data$_i'$={$b_{i,1}, b_{i,2}, \ldots, b_{i,j}, \ldots, b_{i,N'}, s_i$} i∈[1, K], where K is K sets of the feature sequence data, $b_{i,j}$ is the value corresponding to a j(j∈[1, N'])-th point in an i-th set of the feature sequence data, $s_i$ is the power equipment status corresponding to the i-th set of the feature sequence data, and N' is the number of feature sequence points.

Preferably, Step (3) includes the following.

Sweep frequency response feature sequence data is arranged according to an extension direction of a Hilbert curve. Values of a feature sequence are expressed in different colors. Finally, the feature sequence is converted into an image. The selected number of data points of the Hilbert curve must be greater than or equal to the number of data points of the feature sequence. When the number of Hilbert points is greater, the subsequent points may be used to continue to draw a feature sequence once or set to zero, as long as the operation of the entire feature sequence data set is guaranteed to be the same.

Preferably, the Hilbert visualization processing is performed on each set of data in the feature sequence data set, and the Hilbert image data set is obtained. The Hilbert image data set is expressed as data$_i'$={$c_i, s_i$} i∈[1,K], where K is K sets of Hilbert image data, $c_i$ is the Hilbert image converted from an i-th set of data parameters in the feature sequence data set, and $s_i$ is the power equipment status corresponding to an i-th set of the Hilbert image data.

Preferably, when the data set is large enough, a basic neural network model may be directly constructed, and the Hilbert image data set may be used for training and verification. When the amount of data is smaller, a neural network model pre-trained using a large image database may be imported, and the last layer of the network is replaced. For most networks, the layer is a fully connected layer, and is replaced with a new fully connected layer, so that the number of outputs thereof is equal to the number of diagnostic label categories. For some networks (such as SqueezeNet), the last learnable layer is a 1×1 convolutional layer. In this case, the old convolutional layer is replaced with a new convolutional layer, and the number of filters is equal to the number of diagnostic categories. Then, a part of the parameters of the pre-trained network is frozen. The Hilbert image data set is input into different pre-trained neural networks for transfer training and verification.

According to another aspect of the disclosure, a system for power equipment diagnosis based on windowed feature and Hilbert visualization is provided, which includes the following.

A data processing module is configured to obtain several sets of monitoring data containing different fault locations, fault types, and severity of a power equipment, analyze each set of the monitoring data, obtain a corresponding fault status label, and use each set of the monitoring data and the corresponding failure status label to constitute a target data set. The fault status label includes the fault type and the fault location.

A feature extraction module is configured to perform windowed feature calculation on each set of data in the target data set considering logarithmic constraints, extract fault features contained therein, and obtain a feature sequence data set.

A visualization module is configured to perform Hilbert visualization processing on each set of data in the feature sequence data set, and obtain a Hilbert image data set.

A network training module is configured to construct a fault diagnosis and location model, divide the Hilbert image data set into a training set and a verification set, train the fault diagnosis and location model using the training set, and verify the trained fault diagnosis and location model using the verification set.

A diagnosis module is configured to perform the same windowed feature calculation and Hilbert visualization on diagnosis data in a subsequent diagnosis process, and then obtain a final diagnosis result from the trained fault diagnosis and location model.

According to another aspect of the disclosure, a computer-readable storage medium stored with a computer program is provided. The computer program implements the method for power equipment diagnosis based on windowed feature and Hilbert visualization when executed by a processor.

In general, compared with the prior art, the above technical solutions conceived by the disclosure can achieve the following beneficial effects.

The disclosure uses the windowed feature calculation and Hilbert visualization methods to fully highlight the fault features of the monitoring data of the power equipment, and makes full use of the extraction capability of the neural network for complex nonlinear features, so as to improve power equipment fault diagnosis and location accuracy while improving the intelligent level of power equipment fault diagnosis and location.

DETAILED DESCRIPTION OF DISCLOSED EMBODIMENTS

In order for the objectives, technical solutions, and advantages of the disclosure to be more comprehensible, the disclosure is further described in detail below with reference to the accompanying drawings and embodiments. It should be understood that the specific embodiments described here are only used to explain the disclosure, but not to limit the disclosure. In addition, the technical features involved in the various embodiments of the disclosure described below may be combined with each other as long as there is no conflict therebetween.

The disclosure provides a method for power equipment diagnosis based on windowed feature and Hilbert visualization, and takes fault location of sweep frequency response analysis of a transformer as specific embodiments for description. However, the disclosure is not only applicable to the fault location of the sweep frequency response analysis of a transformer winding, but may also be extended to other fields of diagnosis and location.

First, an original data set of sweep frequency response containing fault features of a transformer is obtained. Then, windowed feature calculation considering logarithmic constraints is introduced to process original data, and a feature sequence is obtained. Graphical features of the feature sequence are further highlighted using a Hilbert visualization method. A Hilbert image data set is obtained, and is used for transfer training and verification of a deep convolutional neural network. Finally, newly obtained sweep frequency response data may be directly input into the trained network for diagnosis after performing the windowed feature calculation and Hilbert visualization processing. A location result is obtained. The disclosure converts one-dimensional frequency response data into a two-dimensional Hilbert image, which provides a new way of expression for a sweep frequency response fingerprint. In addition, the logarithmic constraints are introduced when performing the feature calculation, which reduces the influence of extreme values on the image and highlights the graphical features of the feature sequence. Finally, the model may obtain higher accuracy.

Figure 1:
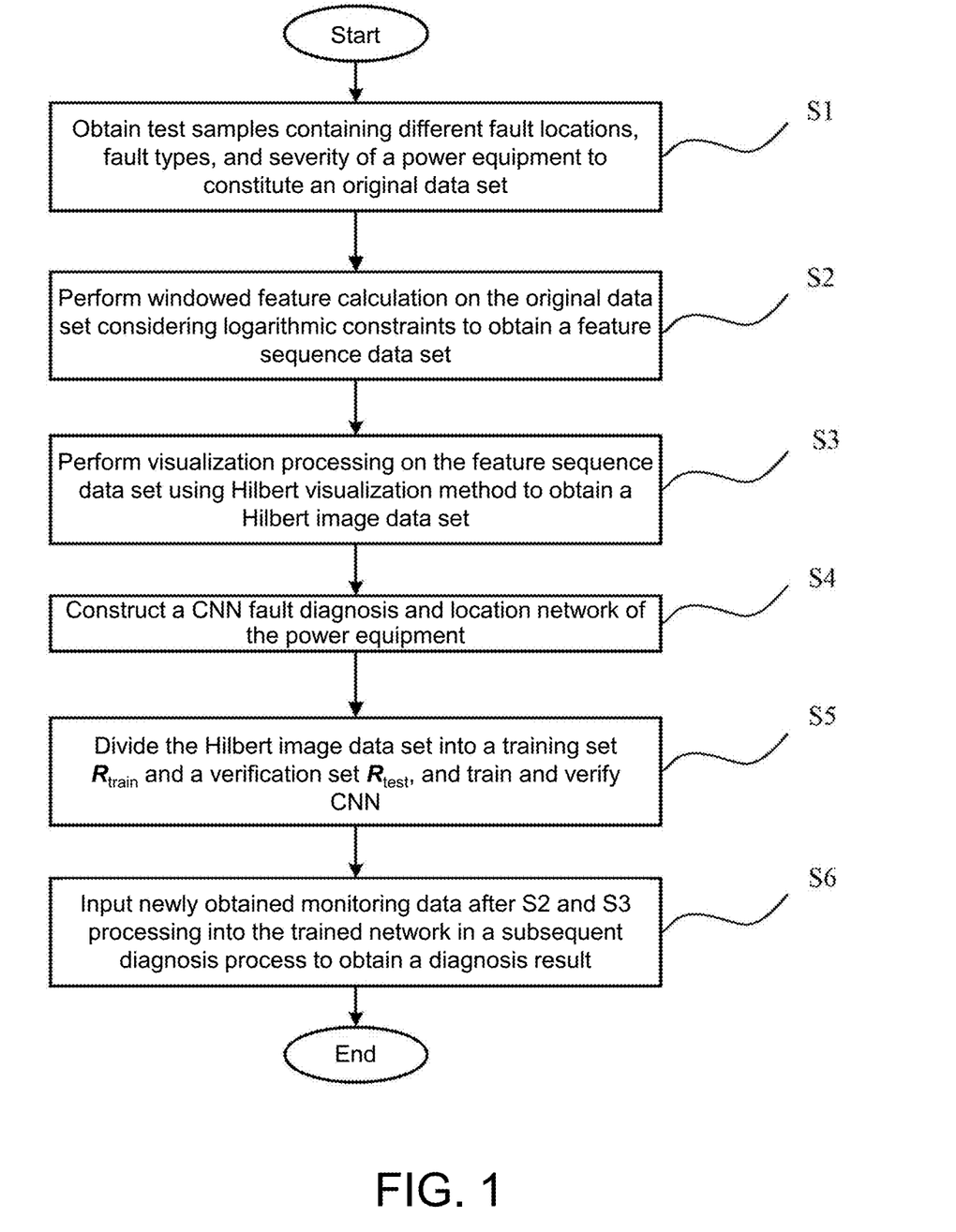
FIG. 1 is a schematic diagram of a flowchart of a transformer depth vision fault location method considering windowed feature calculation and Hilbert visualization according to an embodiment of the disclosure.
Figure 3:
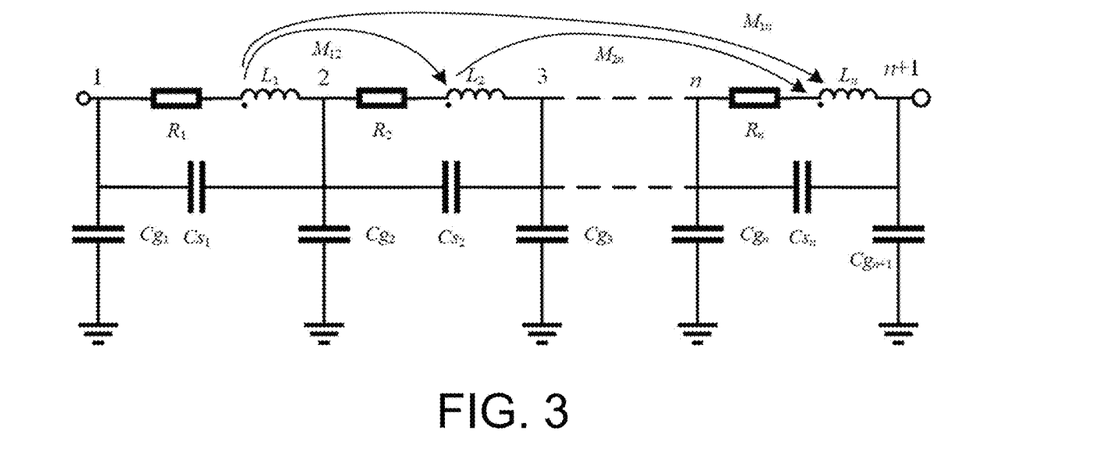
FIG. 3 is a schematic diagram of an equivalent circuit of a transformer winding according to an embodiment of the disclosure.

As shown in FIG. 3, the fault location of a power transformer winding is taken as an example. FIG. 1 shows a schematic diagram of a flowchart of the method for power equipment diagnosis based on windowed feature and Hilbert visualization according to the embodiment of the disclosure, which includes the following steps.

S1: Several sets of monitoring data of each transformer sweep frequency response are obtained. Each set of the monitoring data is analyzed. A corresponding fault status label is obtained. Each set of the monitoring data and the corresponding fault status label are used to constitute a target data set. The fault status label includes the fault type and the fault location.

In the embodiment of the disclosure, the data may be taken from FR curve data containing complex fault features obtained based on PSpice simulation and the corresponding transformer fault status label thereof.

In the embodiment of the disclosure, the several sets of the monitoring data of the transformer sweep frequency response in Step S1 may be expressed as:

$$\text{data}_i = \{a_{i,1}, a_{i,2}, \ldots, a_{i,j}, \ldots, a_{i,N}, s_i\} i \in [1, K]$$

where K is K sets of sweep frequency response monitoring data, $a_{i,j}$ is the response value corresponding to a j($j \in [1, N]$)-th point frequency in an i-th set of dissolved gas monitoring data, $s_i$ is the transformer fault status label (including the fault type and the fault location) corresponding to the i-th set of the sweep frequency response monitoring data, and N is the number of scanning frequency points.

Figure 2:
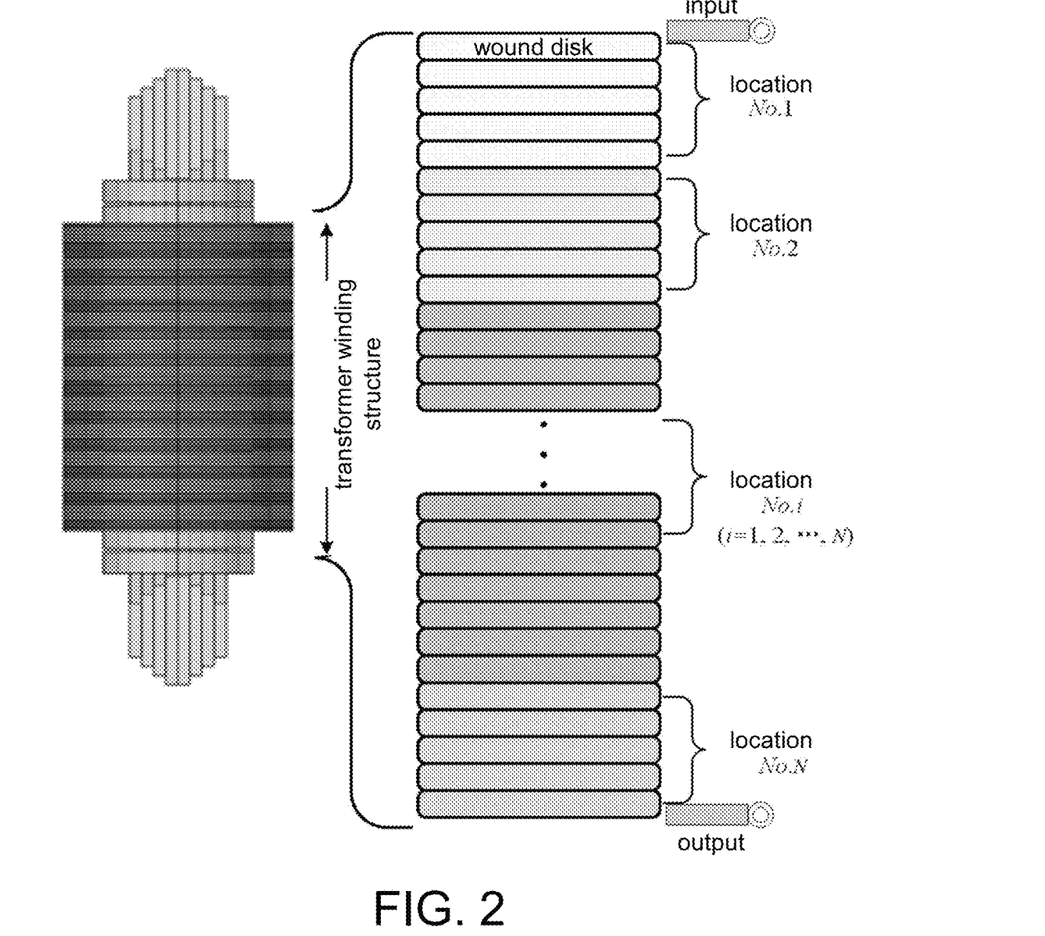
FIG. 2 is a schematic diagram of division of transformer fault locations according to an embodiment of the disclosure.

In the embodiment of the disclosure, as shown in FIG. 2, transformer fault locations (statuses) are divided into 8 types, which are respectively the normal state and faults occurring in seven types of different locations, corresponding to labels 0 to 7. Different faults may occur at the same location, but the corresponding labels are the same. Specific data is as shown in Table

TABLE 1

Data set of sweep frequency response analysis of transformer winding

| Label | Synchronous fault of inductance L and mutual inductance | Capacitor Cd fault | Capacitor Cg fault | Simultaneous asynchronous fault of the three | Sum |
|---|---|---|---|---|---|
| 0 | 20 | 20 | 20 | 20 | 80 |
| 1 | 20 | 20 | 20 | 20 | 80 |
| 2 | 20 | 20 | 20 | 20 | 80 |
| 3 | 20 | 20 | 20 | 20 | 80 |
| 4 | 20 | 20 | 20 | 20 | 80 |
| 5 | 20 | 20 | 20 | 20 | 80 |
| 6 | 20 | 20 | 20 | 20 | 80 |
| 7 | 20 | 20 | 20 | 20 | 80 |
| Total | 160 | 160 | 160 | 160 | 640 |

S2: Windowed feature calculation is performed on the target data set considering logarithmic constraints to obtain a feature sequence data set.

Figure 4:
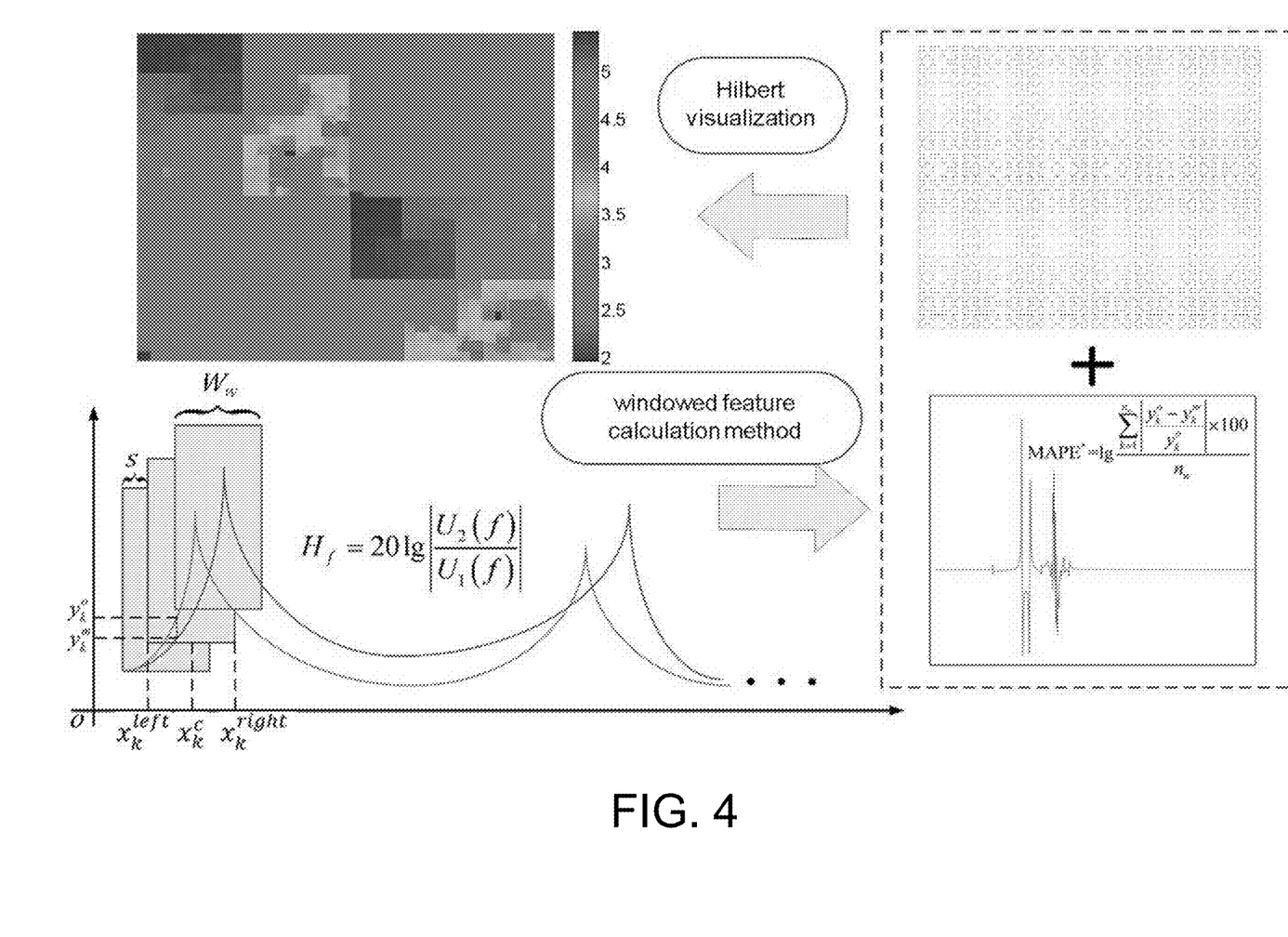
FIG. 4 is a schematic diagram of a process of the windowed feature calculation and the Hilbert visualization according to an embodiment of the disclosure.

In Step S2, as shown in FIG. 4, a sweep frequency response curve (such as a FR fingerprint curve) of the transformer in the normal state needs to be taken as a reference, and the calculation of a feature value is performed based thereon. The feature value may be an evaluation indicator of the FR curve provided by different research work, such as a correlation coefficient (CC), a root mean square error (RMSE), a mean absolute percentage error (MAPE), etc. For example, the calculation formula of MAPE after adding the logarithmic constraints is:

$$MAPE^* = lg \frac{\sum_{k=1}^{n_w} \left| \frac{y_k^o - y_k^m}{y_k^o} \right| \times 100}{n_w},$$

where MAPE* refers to MAPE introduced with the logarithmic constraints, $y_k^o$ is the y-coordinate of a point on the FR fingerprint curve in a k-th window obtained, $y_k^m$ is the x-coordinate of a point on other FR curves, and $n_w$ is the number of points in each window.

When performing the windowed feature calculation considering the logarithmic constraints, a window with a specified length $W_w$ is first defined. The window scans a frequency band step by step with a step size s from a starting point $x_0$ of a scanning frequency band range to an end $x_n$. Each time the window moves one step, the feature value is calculated within a frequency region of the length $W_w$ of the window. The finally obtained feature sequence length is $$N' = \text{floor}\left(\frac{(x_n - x_0) - W_w}{s}\right) + 1,$$

where s and $W_w$ are positive integer multiples of an FR scanning frequency interval. The entire FR frequency band is to be scanned, thus $W_w \geq 2s$. floor represents a round-down function, and returns to the largest previous integer. An x-coordinate of a symmetry axis of a k(k=1, 2, . . . , N')-th window is $$x_k^c = x_0 + \frac{W_w}{2} + (k-1) \cdot s.$$

An x-coordinate of a left boundary is $$x_k^{left} = x_k^c - \frac{W_w}{2}.$$

An x-coordinate of a right boundary is $$x_k^{right} = x_k^c + \frac{W_w}{2}.$$

A number of points contained in each window is $$n_w = \frac{W_w}{\Delta f} + 1,$$

where $\Delta f$ is the scanning frequency interval.

the feature sequence data obtained after the windowed feature calculation is $data_i' = \{b_{i,1}, b_{i,2}, \ldots, b_{i,j}, \ldots, b_{i,N'}, s_i\}$ $i \in [1, K]$, where K is K sets of sweep frequency response feature sequence data, $b_{i,j}$ is the value corresponding to a $j(j \in [1, N'])$-th point in an i-th set of the sweep frequency response feature sequence data, $s_i$ is the transformer status corresponding to the i-th set of the sweep frequency response feature sequence data, and N' is the number of feature sequence points.

S3: The Hilbert visualization processing is performed on each set of data in the feature sequence data set, and a Hilbert image data set is obtained.

In Step S3, as shown in FIG. 4, a 6th order Hilbert curve is selected for data visualization. Since the selected number of data points of the Hilbert curve must be greater than or equal to the number of data points of the feature sequence in order to fully present the feature sequence in the image, when the number of Hilbert points is greater, the subsequent points may be used to continue to draw a feature sequence once or set to zero, as long as the operation of the entire feature sequence data set is guaranteed to be the same. In the embodiment, the method of continuing to draw the feature sequence once is adopted.

S4: A convolutional neural network (CNN) fault location model is constructed. The Hilbert image data set is divided into a training set and a verification set. The CNN fault location model is trained using the training set. A trained CNN diagnosis model is verified using the verification set.

As an optional implementation, when the number of Hilbert image data sets is greater than or equal to a preset number threshold, it indicates that the amount of data is large enough to construct the most basic CNN diagnosis model, and the CNN diagnosis model is trained and verified using big data. When the number of Hilbert image data sets is less than or equal to the preset number threshold, it indicates that the amount of data is smaller, transfer learning may be used to perform transfer training and verification on classic models, such as ResNet50. The training set and the verification set are divided into 8:2.

The preset number threshold may be determined according to actual requirements, which is not uniquely limited by the embodiments of the disclosure.

In the embodiment of the disclosure, other models may also be chosen as the CNN diagnosis model, which is not uniquely limited by the embodiments of the disclosure.

As an optional implementation, Step S4 uses transfer learning to perform transfer training and verification on the classic model ResNet50. Firstly, the last fully connected layer of ResNet50 is replaced, so that the number of outputs thereof is equal to the number of diagnostic label categories, which is 8 in the embodiment. Then, the parameters of the first 50% layers of the pre-trained network are frozen. Finally, hyperparameters of the transfer training based on the ResNet50 model are set as shown in Table 3. The training set is input train the unfrozen part of the network, and the verification set is used to verify.

TABLE 3

Hyperparameter setting of CNN diagnostic model

| Hyperparameter name | Setting |
|---|---|
| Initial gradient | 0.00006 |
| Minimum batch | 100 |
| Number of iterations | 150 |
| Learning plan | Segmented |
| Starting drop location of learning rate | 100 |
| Drop factor of learning rate | 0.2 |
| Optimizer | 'adam' |

Finally, the location accuracy of the fault location model of the transformer winding according to the embodiment is 94.53%.

Figure 5:
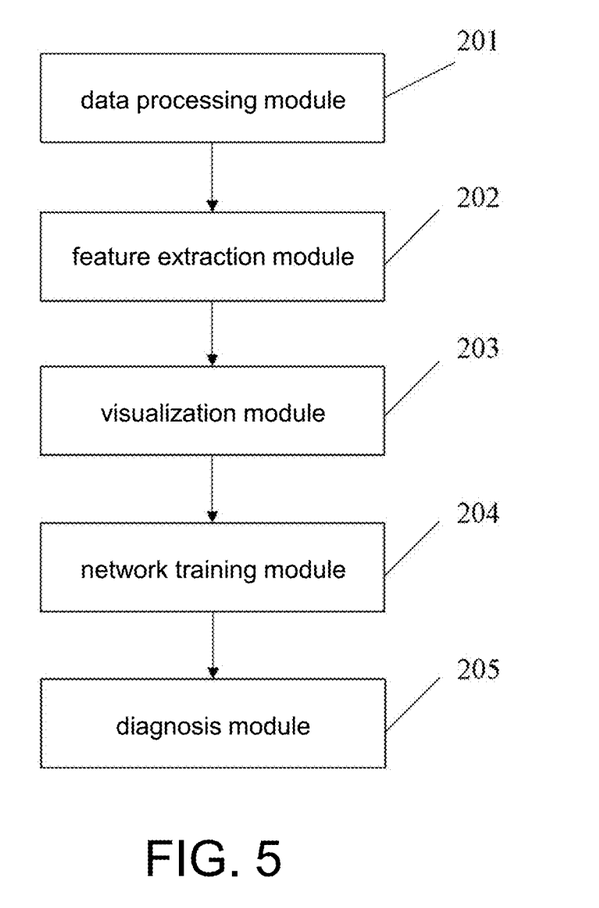
FIG. 5 is a schematic diagram of a system structure according to an embodiment of the disclosure.

FIG. 5 shows a schematic diagram of a structure of a transformer depth vision fault location system considering windowed feature calculation and Hilbert visualization according to an embodiment of the disclosure, which includes the following.

A data processing module 201 is configured to obtain several sets of monitoring data containing different fault locations, fault types, and severity of a power equipment, analyze each set of the monitoring data, obtain a corresponding fault status label, and use each set of the monitoring data and the corresponding failure status label to constitute a target data set. The fault status label includes the fault type and the fault location.

A feature extraction module 202 is configured to perform windowed feature calculation on each set of data in the target data set considering logarithmic constraints, extract fault features contained therein, and obtain a feature sequence data set.

A visualization module 203 is configured to perform Hilbert visualization processing on each set of data in the feature sequence data set, and obtain a Hilbert image data set.

A network training module 204 is configured to construct a fault diagnosis and location model, divide the Hilbert image data set into a training set and a verification set, train the fault diagnosis and location model using the training set, and verify the trained fault diagnosis and location model using the verification set.

A diagnosis module 205 is configured to directly input newly obtained sweep frequency response data through the feature extraction module and the visualization module into a trained network for diagnosis in a subsequent diagnosis process, so as to obtain a final fault location result.

For the specific implementation of each module, reference may be made to the description of the foregoing embodiment for the method, which will not be reiterated in the embodiment of the disclosure.

In another embodiment of the disclosure, a computer-readable storage medium stored with a computer program is also provided. The computer program implements the method for power equipment diagnosis based on windowed feature and Hilbert visualization in the foregoing embodiment when executed by a processor.

It should be pointed out that according to implementation requirements, each step/component described in the disclosure may be split into more steps/components, or two or more steps/components or partial operations of steps/components may be combined into a new step/component to implement the objective of the disclosure.

The above method according to the disclosure may be implemented in hardware and firmware, implemented as software or computer codes that may be stored in a recording medium (such as compact disc read-only memory (CD ROM), random access memory (RAM), floppy disk, hard disk, or magneto-optical disk), or implemented as computer codes that are originally stored in a remote recording medium or a non-transitory machine-readable medium downloaded through the network and will be stored in a local recording medium, so that the method may be processed by such software stored on a recording medium using a general-purpose computer, a special-purpose processor, or a programmable or special-purpose hardware (such as application specific integrated circuit (ASIC) or field programmable gate array (FPGA)). It may be understood that a computer, a processor, a microprocessor, a controller, or a programmable hardware includes a storage component (for example, RAM, ROM, flash memory, etc.) that may store or receive the software or computer codes. When the software or computer codes are accessed and executed by a computer, a processor, or hardware, the processing method is implemented. Furthermore, when a general-purpose computer accesses codes for implementing the processing, the execution of the codes converts the general-purpose computer into a special-purpose computer for executing the processing.

Persons skilled in the art may easily understand that the above descriptions are only preferred embodiments of the disclosure and are not intended to limit the disclosure. Any modification, equivalent replacement, improvement, etc. made within the spirit and principle of the disclosure should be contained within the protection scope of the disclosure.

What is claimed is:

1. A method for power equipment diagnosis based on windowed feature and Hilbert visualization, comprising:
step 1 of obtaining a plurality of sets of monitoring data comprising different fault locations, fault types, and severity of a power equipment, analyzing each set of the monitoring data, obtaining a corresponding fault status label, and using each set of the monitoring data and the corresponding fault status label to constitute a target data set, wherein the fault status label comprises the fault type and the fault location;

step 2 of performing windowed feature calculation on the target data set considering logarithmic constraints, extracting fault features contained therein, and obtaining a feature sequence data set;

step 3 of performing Hilbert visualization processing on each set of data in the feature sequence data set, and obtaining a Hilbert image data set;

step 4 of constructing a fault diagnosis and location model, dividing the Hilbert image data set into a training set and a verification set, training the fault diagnosis and location model using the training set, and verifying the trained fault diagnosis and location model using the verification set; and step 5 of obtaining a final diagnosis result from the trained fault diagnosis and location model after performing the same windowed feature calculation and Hilbert visualization on diagnosis data.

2. The method according to claim 1, wherein the plurality of sets of the monitoring data of the power equipment is $data_1 = \{a_{i,1}, a_{i,2}, \ldots, a_{i,j}, \ldots, a_{i,N}, s_i\} i \in [1, K]$, where K is K sets of the monitoring data of the power equipment, $a_{i,j}$ is a monitoring value corresponding to a $j(j \in [1, N])$-th point in an i-th set of the monitoring data of the power equipment, $s_i$ is the fault status label of the power equipment corresponding to the i-th set of the monitoring data of the power equipment, and N is a number of monitoring data points.

3. The method according to claim 2, wherein step 2 comprises:

taking a monitoring curve of the power equipment in a normal state as a reference curve, and performing the windowed feature calculation considering the logarithmic constraints based on the reference curve to obtain a feature sequence data set, wherein a feature value is a self-defined evaluation indicator or an evaluation indicator provided by different research work.

4. The method according to claim 3, wherein step 2 comprises:

step 2.1 of defining a window with a specified length $W_w$, wherein the window scans a frequency band step by step with a step size s from a starting point $x_0$ of a scanning frequency band range to an end $x_n$, each time the window moves one step, the feature value is calculated within a frequency region of the length $W_w$ of the window, and a finally obtained feature sequence length is $$N' = \text{floor}\left(\frac{(x_n - x_0) - W_w}{s}\right) + 1,$$

where s and $W_w$ are positive integer multiples of a shortest interval between monitoring points, all monitoring data is to be scanned, thus $W_w \geq 2s$, floor represents a round-down function, and returns to a largest previous integer;

step 2.2 of determining an x-coordinate of a symmetry axis of a $k(k=1, 2, \ldots, N')$-th window from $$x_k^c = x_0 + \frac{W_w}{2} + (k-1) \cdot s,$$

determining an x-coordinate of a left boundary from $$x_k^{left} = x_k^c - \frac{W_w}{2},$$

determining an x-coordinate of a right boundary from $$x_k^{right} = x_k^c + \frac{W_w}{2},$$

and determining a number of points contained in each window from $$n_w = \frac{W_w}{\Delta f} + 1,$$

where $\Delta f$ is an interval between two monitoring points; and step 2.3 of obtaining a windowed feature value considering the logarithmic constraints from the x-coordinate of the symmetry axis, the x-coordinate of the left boundary, the x-coordinate of the right boundary, and the number of points contained in each window based on a selected feature value evaluation indicator, so as to obtain the feature sequence data set.

5. The method according to claim 4, wherein a feature sequence data obtained after the windowed feature calculation is $data'_i = \{b_{i,1}, b_{i,2}, \ldots, b_{i,j}, \ldots b_{i,N'}, s_i\} i \in [1,K]$, where K is K sets of the feature sequence data, $b_{i,j}$ is a value corresponding to a $j(j \in [1,N'])$-th point in an i-th set of the feature sequence data, $s_i$ is a power equipment status corresponding to the i-th set of the feature sequence data, and N' is a number of feature sequence points.

6. The method according to claim 5, wherein step 3 comprises:

arranging sweep frequency response feature sequence data according to an extension direction of a Hilbert curve, expressing values of a feature sequence in different colors, and finally converting the feature sequence into an image, wherein a selected number of data points of the Hilbert curve must be greater than or equal to a number of data points of the feature sequence, when a number of Hilbert points is greater, subsequent points may be used to continue to draw a feature sequence once or set to zero, as long as an operation of an entire feature sequence data set is guaranteed to be the same.

7. The method according to claim 6, further comprising performing the Hilbert visualization processing on each set of the data in the feature sequence data set, and obtaining the Hilbert image data set, wherein the Hilbert image data set is expressed as $data''_i = \{c_i, s_i\} i \in [1,K]$, where K is K sets of Hilbert image data, $c_i$ is a Hilbert image converted from an i-th set of data parameters in the feature sequence data set, and $s_i$ is a power equipment status corresponding to an i-th set of the Hilbert image data.

8. The method according to claim 2, wherein step 2 comprises:

step 2.1 of defining a window with a specified length $W_w$, wherein the window scans a frequency band step by step with a step size s from a starting point $x_0$ of a scanning frequency band range to an end $x_n$, each time the window moves one step, the feature value is calculated within a frequency region of the length $W_w$ of the window, and a finally obtained feature sequence length is $$N' = \text{floor}\left(\frac{(x_n - x_0) - W_w}{s}\right) + 1,$$

where s and $W_w$ are positive integer multiples of a shortest interval between monitoring points, all monitoring data is to be scanned, thus $W_w \geq 2s$, floor represents a round-down function, and returns to a largest previous integer;

step 2.2 of determining an x-coordinate of a symmetry axis of a k(k=1, 2, ..., N')-th window from $$x_k^c = x_0 + \frac{W_w}{2} + (k-1) \cdot s,$$

determining an x-coordinate of a left boundary from $$x_k^{left} = x_k^c - \frac{W_w}{2},$$

determining an x-coordinate of a right boundary from $$x_k^{right} = x_k^c + \frac{W_w}{2},$$

and determining a number of points contained in each window from $$n_w = \frac{W_w}{\Delta f} + 1,$$

where $\Delta f$ is an interval between two monitoring points; and step 2.3 of obtaining a windowed feature value considering the logarithmic constraints from the x-coordinate of the symmetry axis, the x-coordinate of the left boundary, the x-coordinate of the right boundary, and the number of points contained in each window based on a selected feature value evaluation indicator, so as to obtain the feature sequence data set.

9. The method according to claim 8, wherein a feature sequence data obtained after the windowed feature calculation is data$_i$={$b_{i,1}$, $b_{i,2}$, ..., $b_{i,j}$, ... $b_{i,N'}$, $s_i$}i $\in$[1, K], where K is K sets of the feature sequence data, $b_{i,j}$ is a value corresponding to a j(j$\in$[1, N'])-th point in an i-th set of the feature sequence data, $s_i$ is a power equipment status corresponding to the i-th set of the feature sequence data, and N' is a number of feature sequence points.

10. The method according to claim 9, wherein step 3 comprises:
arranging sweep frequency response feature sequence data according to an extension direction of a Hilbert curve, expressing values of a feature sequence in different colors, and finally converting the feature sequence into an image, wherein a selected number of data points of the Hilbert curve must be greater than or equal to a number of data points of the feature sequence, when a number of Hilbert points is greater, subsequent points may be used to continue to draw a feature sequence once or set to zero, as long as an operation of an entire feature sequence data set is guaranteed to be the same.

11. The method according to claim 10, further comprising performing the Hilbert visualization processing on each set of the data in the feature sequence data set, and obtaining the Hilbert image data set, wherein the Hilbert image data set is expressed as data"$_i$={$c_i$, $s_i$}i$\in$[1, K], where K is K sets of Hilbert image data, $c_i$ is a Hilbert image converted from an i-th set of data parameters in the feature sequence data set, and $s_i$ is a power equipment status corresponding to an i-th set of the Hilbert image data.

12. The method according to claim 1, wherein step 4 comprises:
constructing a basic neural network model when a number of the Hilbert image data sets is greater than or equal to a preset number threshold, and training and verifying using the Hilbert image data set; and
importing a neural network model pre-trained using a large image database when the number of the Hilbert image data sets is less than the preset number threshold, replacing a last layer of the imported neural network model, so that a number of outputs thereof is equal to a number of diagnostic label categories, then freezing a part of parameters of the pre-trained neural network model, and inputting the Hilbert image data set into different pre-trained neural network models for transfer training and verification.

13. A system for power equipment diagnosis based on windowed feature and Hilbert visualization, comprising a processor configured to:
obtaining a plurality of sets of monitoring data containing different fault locations, fault types, and severity of a power equipment, analyzing each set of the monitoring data, obtaining a corresponding fault status label, and using each set of the monitoring data and the corresponding failure status label to constitute a target data set, wherein the fault status label comprises the fault type and the fault location;
performing windowed feature calculation on each set of data in the target data set considering logarithmic constraints, extracting fault features contained therein, and obtaining a feature sequence data set;
performing Hilbert visualization processing on each set of data in the feature sequence data set, and obtaining a Hilbert image data set;
constructing a fault diagnosis and location model, divide the Hilbert image data set into a training set and a verification set, training the fault diagnosis and location model using the training set, and verifying the trained fault diagnosis and location model using the verification set; and
performing the same windowed feature calculation and Hilbert visualization on diagnosis data in a subsequent diagnosis process, and then obtaining a final diagnosis result from the trained fault diagnosis and location model.

* * * * *